United States Patent
Lee et al.

(10) Patent No.: US 9,715,444 B2
(45) Date of Patent: Jul. 25, 2017

(54) STORAGE DEVICE HAVING NONVOLATILE MEMORY DEVICE AND WRITE METHOD

(71) Applicants: Joonho Lee, Hwaseong-si (KR);
Jong-Nam Baek, Hwaseong-si (KR);
Dong-Hoon Ham, Hwaseong-si (KR);
Sang-Wook Yoo, Seongnam-si (KR);
Intae Hwang, Suwon-si (KR)

(72) Inventors: Joonho Lee, Hwaseong-si (KR);
Jong-Nam Baek, Hwaseong-si (KR);
Dong-Hoon Ham, Hwaseong-si (KR);
Sang-Wook Yoo, Seongnam-si (KR);
Intae Hwang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 477 days.

(21) Appl. No.: 13/786,787

(22) Filed: Mar. 6, 2013

(65) Prior Publication Data
US 2013/0326119 A1 Dec. 5, 2013

(30) Foreign Application Priority Data
Jun. 1, 2012 (KR) .................. 10-2012-0059353

(51) Int. Cl.
*G06F 12/02* (2006.01)
*G06F 11/14* (2006.01)

(52) U.S. Cl.
CPC ...... *G06F 12/0246* (2013.01); *G06F 11/1471* (2013.01); *G06F 2212/7202* (2013.01)

(58) Field of Classification Search
CPC .................................. G06F 11/1471
See application file for complete search history.

(56) References Cited

U.S. PATENT DOCUMENTS

| | | | |
|---|---|---|---|
| 6,237,072 B1 | 5/2001 | Houlsdworth | |
| 6,732,124 B1 * | 5/2004 | Koseki | ............ G06F 11/1435 |
| 7,173,862 B2 | 2/2007 | Futatsuyama et al. | |
| 7,653,798 B2 | 1/2010 | Kim et al. | |
| 7,872,921 B2 | 1/2011 | Kim | |
| 8,213,240 B2 | 7/2012 | Kim | |
| 8,266,396 B2 | 9/2012 | Yano et al. | |

(Continued)

FOREIGN PATENT DOCUMENTS

| | | |
|---|---|---|
| CN | 1389730 A | 1/2003 |
| CN | 102193872 A | 9/2011 |

(Continued)

OTHER PUBLICATIONS

Examination Report From China Patent Office Date May 15, 2017.

*Primary Examiner* — Charles Rones
*Assistant Examiner* — Ryan Dare
(74) *Attorney, Agent, or Firm* — Volentine & Whitt, PLLC

(57) ABSTRACT

Disclosed is a method of writing data in a storage device including a nonvolatile memory device. The method includes receiving write data with a write request, detecting a number of free blocks, if the detected number of free blocks is less than a threshold value, allocating a log block only in accordance with a sub-block unit, but if the detected number of free blocks is not less than the threshold value, allocating the log block in accordance with one of the sub-block unit and a physical block unit, wherein the sub-block unit is smaller than the physical block unit.

20 Claims, 16 Drawing Sheets

(56) References Cited

U.S. PATENT DOCUMENTS

| | | |
|---|---|---|
| 2005/0268049 A1 | 12/2005 | De Lange |
| 2006/0256623 A1 | 11/2006 | Roohparvar |
| 2012/0072657 A1* | 3/2012 | Lee et al. .................. 711/104 |
| 2012/0144095 A1* | 6/2012 | Han et al. .................. 711/103 |

FOREIGN PATENT DOCUMENTS

| | | |
|---|---|---|
| JP | 2005-078634 | 3/2005 |
| JP | 2008-171103 | 7/2008 |
| JP | 2008-293615 | 12/2008 |
| JP | 2009-259145 | 11/2009 |
| KR | 1020080045833 A | 5/2008 |
| KR | 101020781 B1 | 9/2010 |
| KR | 10220110095104 A | 8/2011 |

\* cited by examiner

Fig. 7

| NS_j | | Erase Bias | | | |
|---|---|---|---|---|---|
| | | SB0 | SB1 | SB2 | PB |
| | BL | Float | Float | Float | Float |
| | SSL1 — SST | Float | Float | Float | Float |
| SB2 | WL<5> — MC6 | Float | Float | 0V | 0V |
| SB2 | WL<4> — MC5 | Float | Float | 0V | 0V |
| SB1 | WL<3> — MC4 | Float | 0V | Float | 0V |
| SB1 | WL<2> — MC3 | Float | 0V | Float | 0V |
| SB0 | WL<1> — MC2 | 0V | Float | Float | 0V |
| SB0 | WL<0> — MC1 | 0V | Float | Float | 0V |
| | GSL — GST | Float | Float | Float | Float |
| | CSL/Sub | Vers | Vers | Vers | Vers |

STORAGE DEVICE HAVING NONVOLATILE MEMORY DEVICE AND WRITE METHOD

CROSS-REFERENCE TO RELATED APPLICATIONS

A claim for priority under 35 U.S.C. §119 is made to Korean Patent Application No. 10-2012-0059353 filed Jun. 1, 2012, the subject matter of which is hereby incorporated by reference.

BACKGROUND

The inventive concept relates to semiconductor memory devices, and more particularly, to storage devices including nonvolatile memory device(s), as well as write methods operative within storage devices including nonvolatile memory device(s).

Semiconductor memory devices may be classified as volatile or nonvolatile according to their operative nature. Volatile memory devices operate at relatively high speed, but stored data is lost in the absence of applied power. In contrast, nonvolatile memory devices are able to retain stored data in the absence of applied power.

Nonvolatile memory devices may include the mask read-only memory (MROM), programmable ROM (PROM), erasable programmable ROM (EPROM), electrically erasable programmable ROM (EEPROM), and the like. Flash memory is one type of EEPROM having significant commercial importance. For example, flash memory is widely used to store voice and image data in information appliances such as the computer, cellular phone, PDA, digital camera, camcorder, voice recorder, MP3 player, handheld PC, game machine, facsimile, scanner, printer, and the like.

In recent years, many semiconductor memory devices have been designed and fabricated to include stacked or three dimensional memory cell arrays. Three dimensional memory cell arrays provide improved increased data storage density, or stored data per unit area of memory cell array.

SUMMARY

One aspect of embodiments of the inventive concept is directed to a method of storing write data in a storage device including a nonvolatile memory device having a memory cell array of nonvolatile memory cells. The method includes; receiving write data in conjunction with a write request indicating a write operation, in response to the write request, detecting a number of free blocks available in the memory cell array, if the detected number of free blocks is less than a threshold value, allocating a log block only in accordance with a sub-block unit, and if the detected number of free blocks is not less than the threshold value, allocating the log block in accordance with one of the sub-block unit and a physical block unit, wherein the sub-block unit is smaller than the physical block unit, and executing the write operation for the write data according to the log block.

Another aspect of embodiments of the inventive concept is directed to a method of storing write data in a storage device including a nonvolatile memory device having a memory cell array of nonvolatile memory cells. The method includes; receiving write data in conjunction with a write request indicating a write operation, in response to the write request, determining a number of bad blocks among a plurality of memory blocks in the memory cell array, if the number of bad blocks is greater than a threshold value, allocating a log block only in accordance with a sub-block unit, and if the number of bad blocks is not greater than the threshold value, allocating the log block in accordance with one of the sub-block unit and a physical block unit, wherein the sub-block unit is smaller than the physical block unit, and executing the write operation for the write data according to the log block.

BRIEF DESCRIPTION OF THE DRAWINGS

The above and other objects and features will become apparent from the following description with reference to the accompanying drawings.

FIG. 7 is a diagram illustrating certain bias conditions that may be used to perform a partial erase operation of a nonvolatile memory device according to an embodiment of the inventive concept.

DETAILED DESCRIPTION

Figure 1:
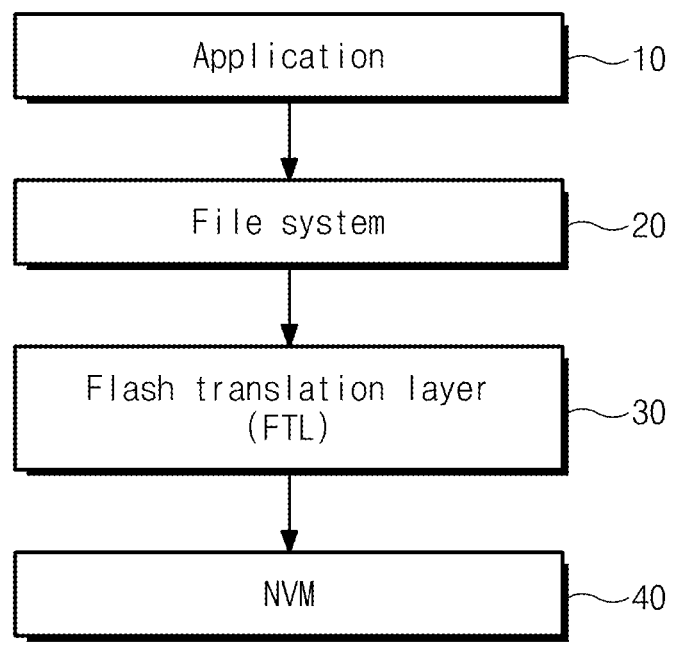
FIG. 1 is a block diagram illustrating a software layer structure that may be used to drive a memory system according to an embodiment of the inventive concept.

Embodiments of the inventive concept will now be described in some additional detail with reference to the accompanying drawings. The inventive concept, however, may be embodied in various different forms, and should not be construed as being limited to only the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements and features throughout the attached drawings and written description.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, features and functions of the inventive concept will be exemplarily described in the context of certain flash memory device(s) as a nonvolatile storage medium. However, the inventive concept is not limited thereto. Other nonvolatile memory devices may be used as a storage medium. For example, the storage medium may be formed of a PRAM, an MRAM, a ReRAM, a FRAM, a NOR flash memory, or the like. The storage medium may also be applied to a memory system including different types of memory devices.

However implemented, the "memory area" (i.e., the available memory space capable of storing data) of a storage device may be managed using an erase-after-write approach. Using such an approach, certain memory blocks defined within the memory area may be termed a "free block" when they are available for the writing of data.

As will be appreciated by those skilled in the art, certain nonvolatile memory devices are erased according to a block unit. Thus, the term "free block" may be used to indicate a memory block erased following a merge operation. Alternatively, the term "free block" may be used to indicate both an erased memory block and a memory block in which previously data is now indicted as being invalid. That is, the term "free block" may be used to indicate a memory block wherein data may be immediately written by a current write (or program) operation being performed in a storage device.

FIG. 1 is a block diagram illustrating a software layer structure that may be used to drive a memory system according to an embodiment of the inventive concept. Referring to FIG. 1, a flash translation layer 30 may be used to translate logical addresses (e.g., sector addresses and sector numbers) provided an application 10 and/or a file system 20 into corresponding physical addresses.

The flash translation layer 30 may configure, at least in part, as an address mapping table capable of mapping a logical address onto a corresponding physical address of a nonvolatile memory (NVM) device 40. Various address mapping schemes may be applied to the flash translation layer 30 according to variously defined mapping units. Typical, conventionally understood, address mapping schemes include page mapping, block mapping, and log mapping, as examples.

In response to a write request, the flash translation layer 30 may assign a log block in view of a number of available free blocks and in accordance with a detected write pattern for the "write data" (i.e., data to be written to the NVM 40) associated with the write request. In the event that the provided write data is "random" in its nature, the flash translation layer 30 may assign a log block according to a sub-block unit. However, if the write data is sequential in its nature, the flash translation layer 30 may assign a log block according to a physical block unit. Here, it is assumed that a physical block unit is larger than the sub-block unit. Indeed, in many embodiments a physical block unit may subsume multiple sub-block units.

When the number of free blocks is determined to be sufficient in view of the size of the write data, the flash translation layer 30 may allocate a log block according to either the sub-block unit or physical block unit further in view of the detected "write pattern" (e.g., random verses sequential). However, when the number of free blocks is not sufficient in view of the size of the write data, a log block may be allocated according to the sub-block unit regardless of the detected write pattern of the write data. Using the above-described approach, the time required to perform a merge operation whereby one or more free blocks is generated may be markedly reduced.

It should be noted that the number of merge operations executed by the flash translation layer 30 will affect the overall performance of the constituent memory system. That is, better performance of a memory system may be expected by reducing the number of executed merge operations.

A merge operation may essentially be performed by executing a page copy operation and a block erase operation.

The flash translation layer 30 according to embodiments of the inventive concept may adaptively vary the size of a memory unit to be allocated to a log block or a data block according to the number of free blocks and a write pattern of data. The flash translation layer 30 may accordingly prevent reduced memory system performance due to a lack of free blocks while still supporting a high-capacity memory block unit. According to certain embodiments of the inventive concept, the wasting of memory blocks may be minimized by assigning a memory unit having a relatively small size to a log block or a data block with respect to low-capacity data.

Figure 2:
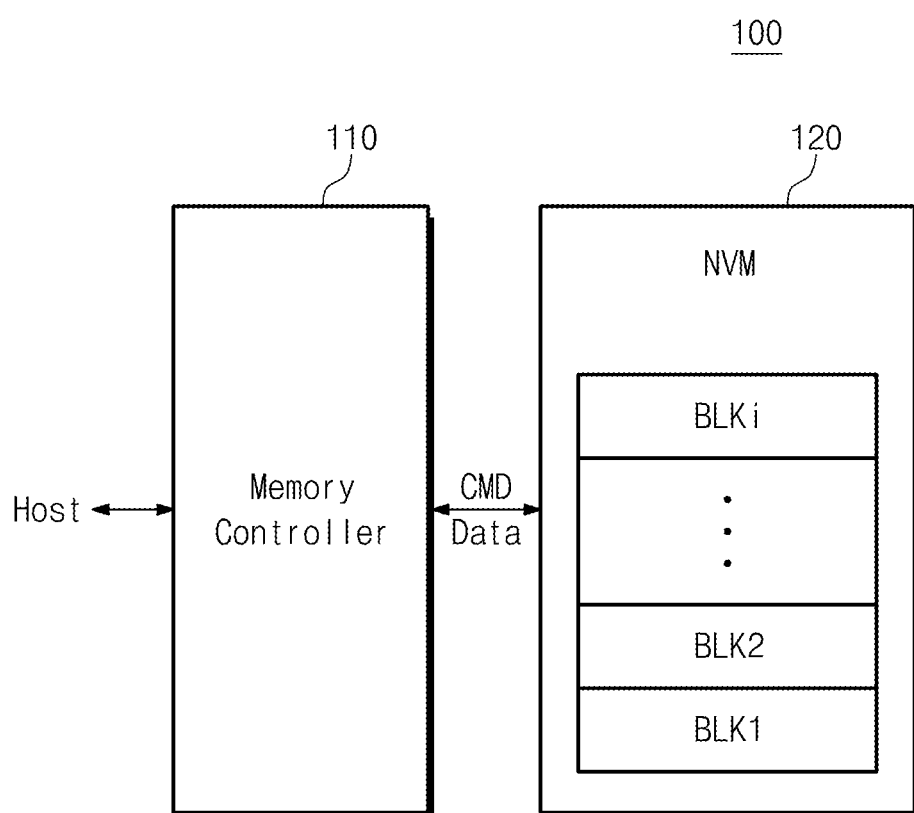
FIG. 2 is a block diagram generally illustrating a memory system according to an embodiment of the inventive concept.

FIG. 2 is a block diagram generally illustrating a memory system according to an embodiment of the inventive concept. Referring to FIG. 2, a memory system 100 may include a memory controller 110 and a nonvolatile memory device 120.

The memory controller 110 may be configured to control the nonvolatile memory device 120 in response to request(s) made by a connected host. The memory controller 110 may be configured to interface with the host and the nonvolatile memory device 120. The memory controller 110 may control the nonvolatile memory device 120 in response to a write request of the host to write data therein. The memory controller 110 may control a read operation of the nonvolatile memory device 120 in response to a read request from the host.

The memory controller 110 may include a flash translation layer (hereinafter, referred to as a FTL). The FTL has traditionally been used to hide erase operations during operation of the nonvolatile memory device 120 from a host file system. The FTL may compensate for drawbacks of the nonvolatile memory device 120, such the size mismatch that may exist between a defined erase unit and a defined write unit. During a write operation directed to the nonvolatile memory device 120, the FTL may be used to map a logical address generated by the host file system onto a corresponding physical address of the nonvolatile memory device 120. In this manner, the FTL being driven by the memory controller 110 may implement an address mapping scheme according to a log mapping method. Benefits of the inventive concept may also be applied to other address mapping methods.

The memory controller 110 may allocate (or assign) a log block or data block depending on the number of free blocks and one or more "attribute(s)" of the write data. Write pattern is one example of a write data attribute that may be used to control the assignment of a log block or data block. Thus, during management of free blocks, the memory controller 110 may assign a log block according to a physical block unit or sub-block unit. Hereafter, the assignment of free blocks may draw upon a designated "free block pool" whether assignment is made according to a log block or a data block. In other words case, a memory unit selected from a free block pool may be allocated according to a log block or data block.

Herein, a physical block may have a unit corresponding to the maximum number of memory blocks that may be erased at the same time. Assuming a three-dimensional nonvolatile memory device in which word lines are stacked in a direction perpendicular to a substrate, a physical block may be defined as a group of cell strings sharing all of the stacked word lines. A sub-block may correspond to a smaller memory unit obtained by dividing one physical block according to a word line unit or a selection line unit. For example, the sub-block may be defined as a unit of memory cells sharing some portion of word line(s) within a physical block.

The wastage of free blocks in response to provided write data may be minimized by assigning log blocks according to a sub-block unit. Within a block management method executed by the memory controller 110 within certain embodiments of the inventive concept, since an erase operation is performed according to a sub-block unit rather than a physical block unit, the corresponding erase time may be shortened. As a result, memory system performance may be improved.

As will be conventionally appreciated, the nonvolatile memory device 120 may perform erase, read, and write operation(s) under the control of the memory controller 110. The nonvolatile memory device 120 will typically include a memory cell array that has been logically designated according to a plurality of memory blocks, wherein each one of the plurality of memory cells is arranged according to at least rows and columns within the memory cell array. Each memory cell in a defined memory block may be configured to store single-level data or multi-level (or, multi-bit) data. As has been previously noted, the memory cells of the nonvolatile memory device 120 may be arranged in a two-dimensional memory cell array or a three-dimensional memory cell array.

It is assumed that the nonvolatile memory device 120 includes a plurality of memory blocks denoted BLK1 to BLKi, wherein each memory block corresponds to an erase unit. Each of the memory blocks BLK1 to BLKi may include a plurality of memory cells that are stacked in a direction intersecting a substrate to form cell strings. Alternatively, each of the memory blocks BLK1 to BLKi may be configured such that a plurality of cell strings are stacked in a direction parallel with the substrate.

As the size (and data storing capacity) of each memory block increases, it becomes increasingly difficult to manage performance using conventional control techniques and methods. The memory system 100 of FIG. 2 is assumed to provide high performance with respect to the nonvolatile memory device 120 including relatively large-capacity memory blocks.

As noted above, the performance of the memory system 100 may be substantially impacted by the number of operationally required merge operations. Within block management methods consistent with the inventive concept, however, the number of operationally required merge operations associated with the large-capacity memory block may be remarkably reduced. As a result, block management methods according to embodiments of the inventive concept may reduce the chance that a block erase operation and a page copy operation (i.e., a merge operation) may be required. Hence, the performance of the memory system 100 may be improved.

As an example, a NAND flash memory will be assumed as the storage medium of the nonvolatile memory device 120. However, the inventive concept is not limited thereto. For example, a PRAM, an MRAM, a ReRAM, a FRAM, or a NOR flash memory may be used as the storage medium. Also, the inventive concept may be applied to a memory system in which different types of memory devices are used together. In particular, technical features of the inventive concept may be applied to a storage device, such as a solid state drive (hereinafter, referred to as an SSD). In this case, the memory controller 110 may be configured to communicate with a host through one of various interface protocols, such as USB, MMC, PCI-E, SATA, PATA, IDE, E-IDE, SCSI, ESDI, and SAS.

Figure 3:
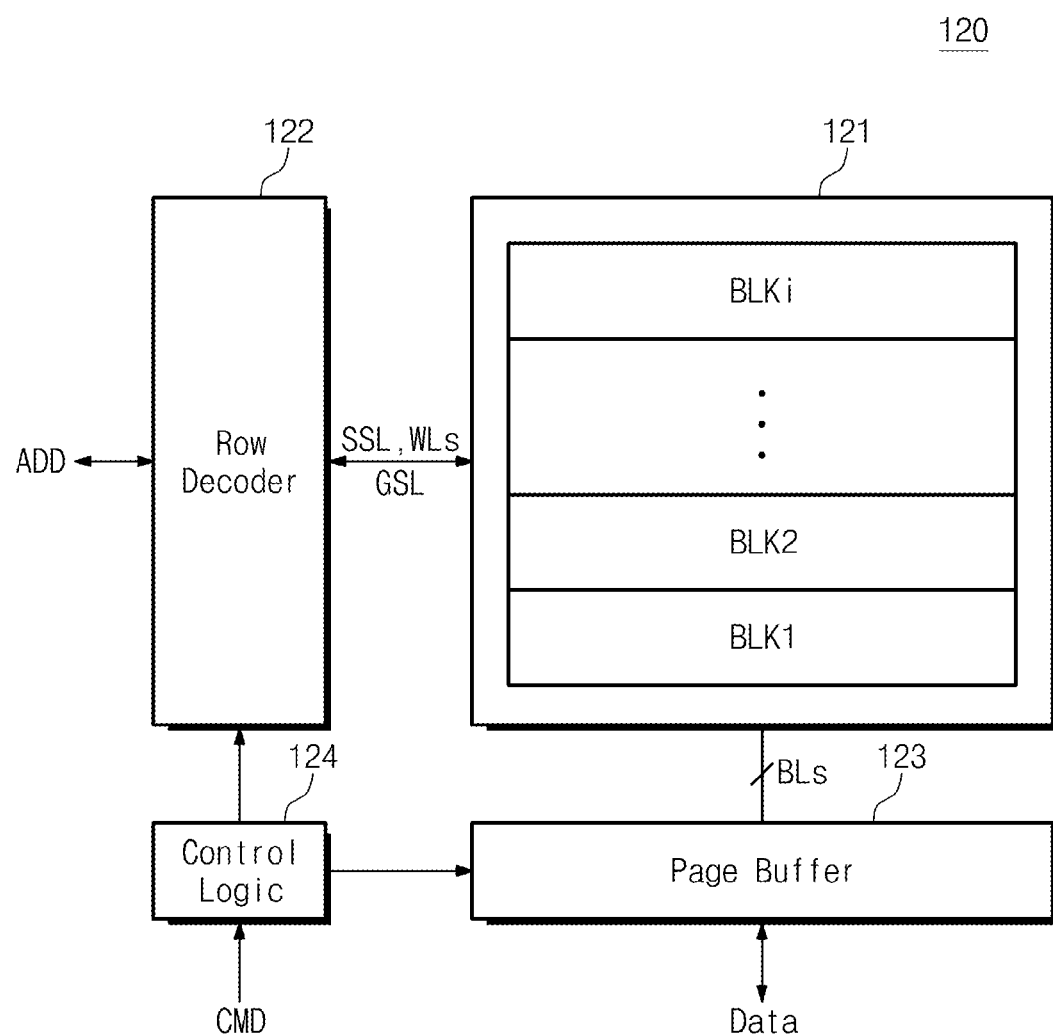
FIG. 3 is a block diagram illustrating a nonvolatile memory device according to an embodiment of the inventive concept.

FIG. 3 is a block diagram illustrating a nonvolatile memory device according to an embodiment of the inventive concept. Referring to FIG. 3, a nonvolatile memory device 120 may include a memory cell array 121, a row decoder 122, a page buffer 123, and control logic 124.

The memory cell array 121 may be connected to the row decoder 122 via word lines or selection lines SSL and GSL. The memory cell array 121 may be connected to the page buffer 123 via bit lines. The memory cell array 121 may include a plurality of NAND cell strings, which constitute a plurality of memory blocks BLK1 to BLKi according to an operation or selection unit. Each of the memory blocks BLK1 to BLKi may include a plurality of sub-blocks.

Each NAND cell string may have a channel formed in a vertical or horizontal direction. The word lines of the memory cell array 121 may be stacked in a vertical direction, and channels of the NAND cell strings may be formed in a vertical direction. A memory device in which the memory cell array 121 is formed to have the above-described string structure may be referred to as a vertical nonvolatile memory device or a three-dimensional nonvolatile memory device.

The row decoder 122 may select one of memory blocks BLK1 to BLKi of the memory cell array 121 in response to an address ADD. The row decoder 122 may select one of word lines in the selected memory block. The row decoder 122 may provide word lines of the selected memory block with word line voltages. At a program operation, the row decoder 122 may transfer a program voltage and a verification voltage to a selected word line and a pass voltage to unselected word lines, respectively. The row decoder 122 may provide selection signals and word line voltages to the selection lines SSL and GSL and the word lines to perform a selection operation by a sub-block unit. The row decoder 122 may perform access operations to the selected sub-block, such as programming, reading, and erasing.

The page buffer 123 may operate as a write driver or a sense amplifier according to a mode of operation. At a program operation, the page buffer 123 may provide a bit line of the cell array 121 with a bit line voltage corresponding to data to be programmed. At a read operation, the page buffer 123 may sense data stored in a selected memory cell via a bit line. The page buffer 123 may latch the sensed data to output it to an external device.

The control logic 124 may control the page buffer 123 and the row decoder 122 in response to a command CMD transferred from the external device. At an erase operation, the control logic 124 may control the row decoder 122 to erase a selected memory block (or, a physical block) or to perform an erase operation by a sub-block unit. An erase operation being executed by the sub-block unit will be more fully described with reference to FIG. 7.

The nonvolatile memory device 120 of the inventive concept may perform an erase operation by a physical block unit or a sub-block unit smaller in size than the physical block unit. With the nonvolatile memory device 120 of the inventive concept, it is possible to remarkably better inefficiency of merge operations performed due to large-capacity memory blocks.

Figure 4:
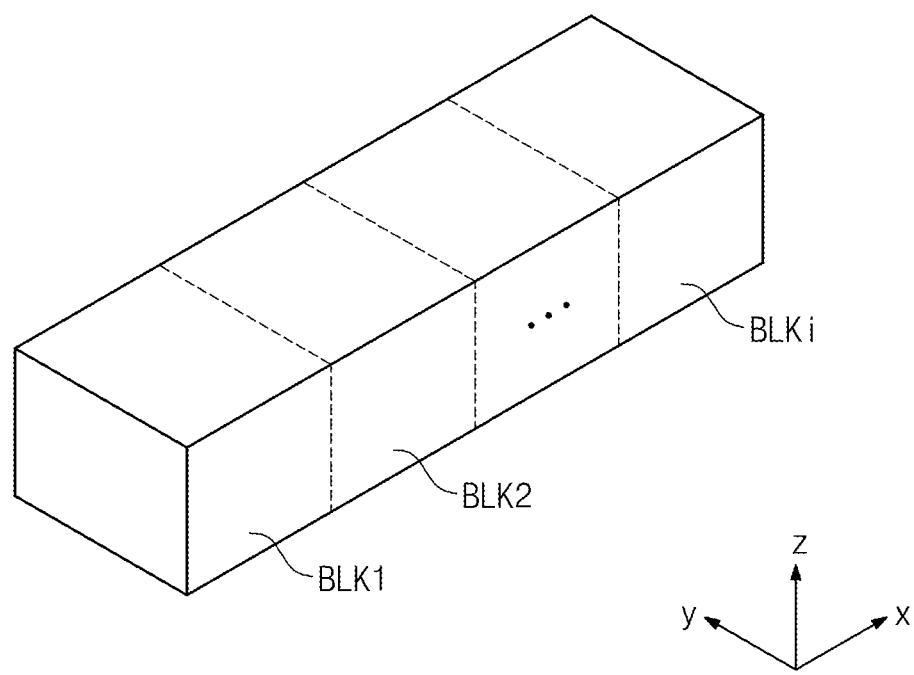
FIG. 4 is a perspective view further illustrating the memory cell array of FIG. 3 according to an embodiment of the inventive concept.

FIG. 4 is a perspective view further illustrating the memory cell array 121 of FIG. 3 according to an embodiment of the inventive concept. Referring to FIG. 4, a memory cell array 121 includes a plurality of memory blocks denoted BLK1 to BLKi, each of which is formed to have a three-dimensional structure (or, a vertical structure). For example, each of the memory blocks BLK1 to BLKi may include structures extending along a plurality of directions x, y, and z corresponding to a three dimension. Each of the memory blocks BLK1 to BLKi may include a plurality of NAND cell strings extending along the z-direction.

Each NAND cell string may be coupled with a bit line, a string selection line, a plurality of word lines, a ground selection line, and a common source line. That is, each memory block may be connected with a plurality of bit lines, a plurality of string selection lines, a plurality of ground selection lines, a plurality of word lines, and a common source line.

One memory block, BLKi, will be described in some additional detail hereafter with reference to FIG. 5.

In certain embodiments of the inventive concept, each of the memory blocks BLk1 to BLKi will correspond to a physical block. A sub-block will then correspond to a smaller memory unit obtained by dividing the physical block according to a word line unit or a selection line unit.

Figure 5:
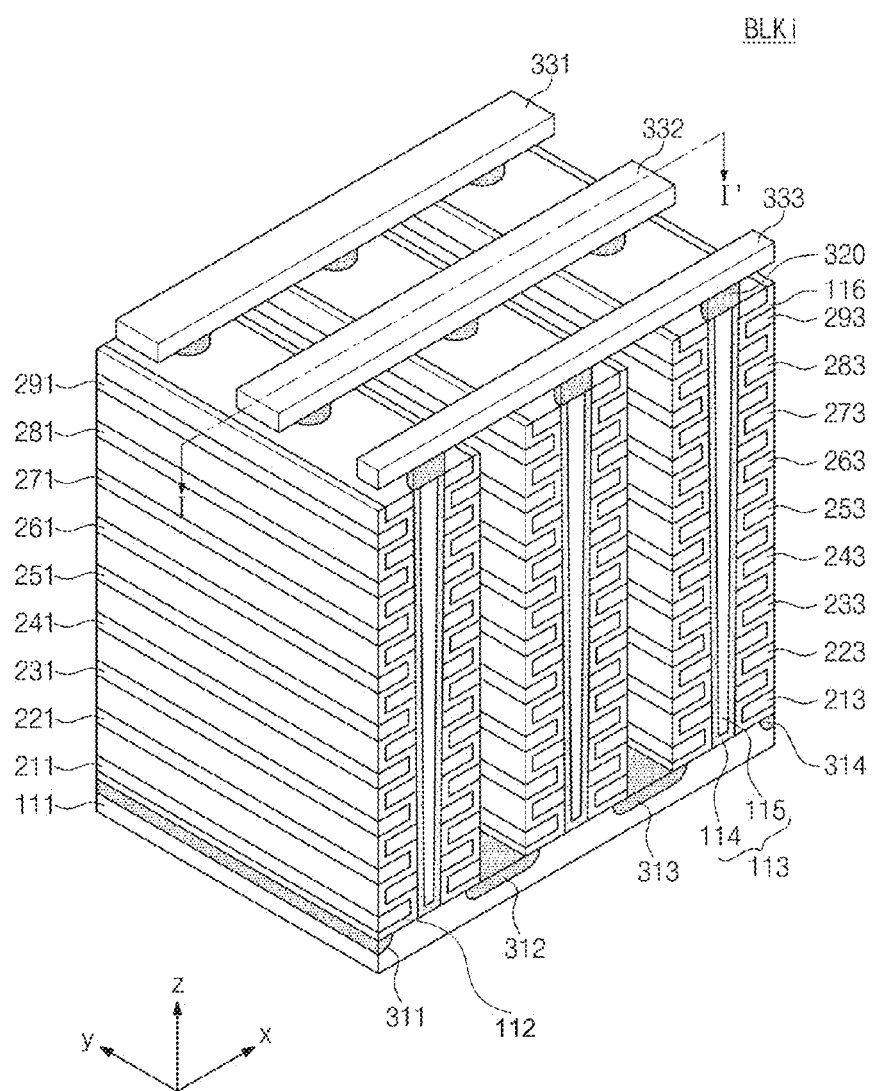
FIG. 5 is a perspective view further illustrating one of the memory blocks of FIG. 4.

FIG. 5 is a perspective view further illustrating the memory block BLKi of FIG. 4. Referring to FIG. 5, a memory block BLK1 may include structures extending along a plurality of directions x, y, and z.

A substrate 111 may be provided to form the memory block BLK1. The substrate 111 may be formed of a p-well in which boron is injected, for example. Alternatively, the substrate 111 may be a pocket p-well provided within an n-well. Below, it is assumed that the substrate 111 is a p-well. However, the substrate 111 is not limited to a p-well.

A plurality of doping regions 311 to 314 extending along the direction x may be provided in the substrate 111. For example, the plurality of doping regions 311 to 314 may be formed of n-type conductors different from that of the substrate 111. Below, it is assumed that first to third doping regions 311 to 314 are n-type. However, the first to third doping regions 311 to 314 are not limited to the n-type.

On the substrate 111 between the first and second doping regions 311 and 312, a plurality of insulation materials 112 extending along the y-direction may be provided sequentially along the z-direction. The insulation materials 112 may be formed to be spaced apart along the z-direction. For example, the insulation materials may include an insulation material such as silicon oxide.

On the substrate 111 between the first and second doping regions 311 and 312, a plurality of pillars 113 may be arranged sequentially along the y-direction so as to penetrate the plurality of insulation materials 112 along the z-direction. For example, the pillars 113 may contact with the substrate 111 through the insulation materials 112. Herein, the pillar 113 may also be formed on the substrate 111 between the second and third doping regions 312 and 313 and on the substrate between third and fourth doping regions 313 and 314.

In example embodiments, each pillar 113 may be formed of a plurality of materials. For example, a surface layer 114 of each pillar 113 may include a first type of silicon material. For example, the surface layer 114 of each pillar 113 may include a silicon material having the same type as the substrate 111. Below, it is assumed that the surface layer 114 of each pillar 113 includes p-type silicon. However, the surface layer 114 of each pillar 113 is not limited to the p-type silicon.

An inner layer 115 of each pillar 113 may be formed of an insulation material. For example, the inner layer 115 of each pillar 113 may include an insulation material such as silicon oxide. For example, the inner layer 115 of each pillar 113 may include air gap.

An insulation film 116 may be provided between the first and second doping regions 311 and 312 along exposed surfaces of the insulation materials 112, the pillars 113, and the substrate 111. In example embodiments, the insulation film 116 can be removed which is provided on an exposed surface (toward the third direction z) of the last insulation material 112 provided along the z-direction.

At a region between the first and second doping regions 311 and 312, first conductive materials 211 to 291 may be provided on an exposed surface of the insulation film 116, respectively. For example, the first conductive material 211 extending along the y-direction may be provided between the substrate 111 and the insulation material 112 adjacent to the substrate 111. In detail, the first conductive material 211 extending in the x-direction may be provided between the substrate 111 and the insulation film 116 of a lower surface of the insulation material 112 adjacent to the substrate 111.

The first conductive material extending along the y-direction may be provided between the insulation film 116 on an upper surface of a specific insulation material of the insulation materials 112 and the insulation film 116 on a lower surface of an insulation material disposed at an upper portion of the specific insulation material. In example embodiments, each of the first conductive materials 211 to 291 may include a metal material. For example, each of the first conductive materials 211 to 291 may include a conductive material such as polysilicon.

The same structure as that on the first and second doping regions 311 and 312 may be provided between the second and third doping regions 312 and 313. For example, between the second and third doping regions 312 and 313, there may be provided a plurality of insulation materials such as insulation materials 112 extending in the y-direction, a plurality of pillars such as pillars 113 disposed sequentially along the y-direction so as to penetrate the insulation materials along the x-direction, an insulation film such as insulation film 116 provided on exposed surfaces of the plurality of pillars and the plurality of insulation materials, and a plurality of first conductive materials such as first conductive materials 211 to 291 extending along the y-direction.

The same structure as that on the first and second doping regions 311 and 312 may be provided at an area between the third and fourth doping regions 313 and 314. For example, at an area between the third and fourth doping regions 313 and 314, there may be provided a plurality of insulation materials 112 extending in the y-direction, a plurality of pillars 113 disposed sequentially along the y-direction so as to penetrate the insulation materials 112 along the z-direction, an insulation film 116 provided on exposed surfaces of the plurality of pillars 113 and the plurality of insulation materials 112, and a plurality of conductive materials 213 to 293 extending along the y-direction.

Drains 320 may be provided on the pillars 113, respectively. The drains 320 may be second-type silicon materials. The drains 320 may be n-type silicon materials. Below, it is assumed that the drains 320 include n-type silicon materials. However, the drains 320 are not limited to include n-type silicon materials. A width of each drain 320 may be wider than that of a corresponding pillar 113. Each drain 320 may be provided on an upper surface of a corresponding pillar 113 in a pad shape, for example.

Conductive materials 331 to 333 extending along the x-direction may be provided on the drains 320, respectively. The conductive materials 331 to 333 may be disposed sequentially along the y-direction. The conductive materials 331 to 333 may be connected with corresponding drains 320, respectively. For example, the drains 320 and the conductive material 333 extending along the x-direction may be connected via contact plugs, respectively. Each of the conductive materials 331 to 333 may be a metallic material. In example embodiments, each of the conductive materials 331 to 333 may be a conductive material such as polysilicon.

Figure 6:
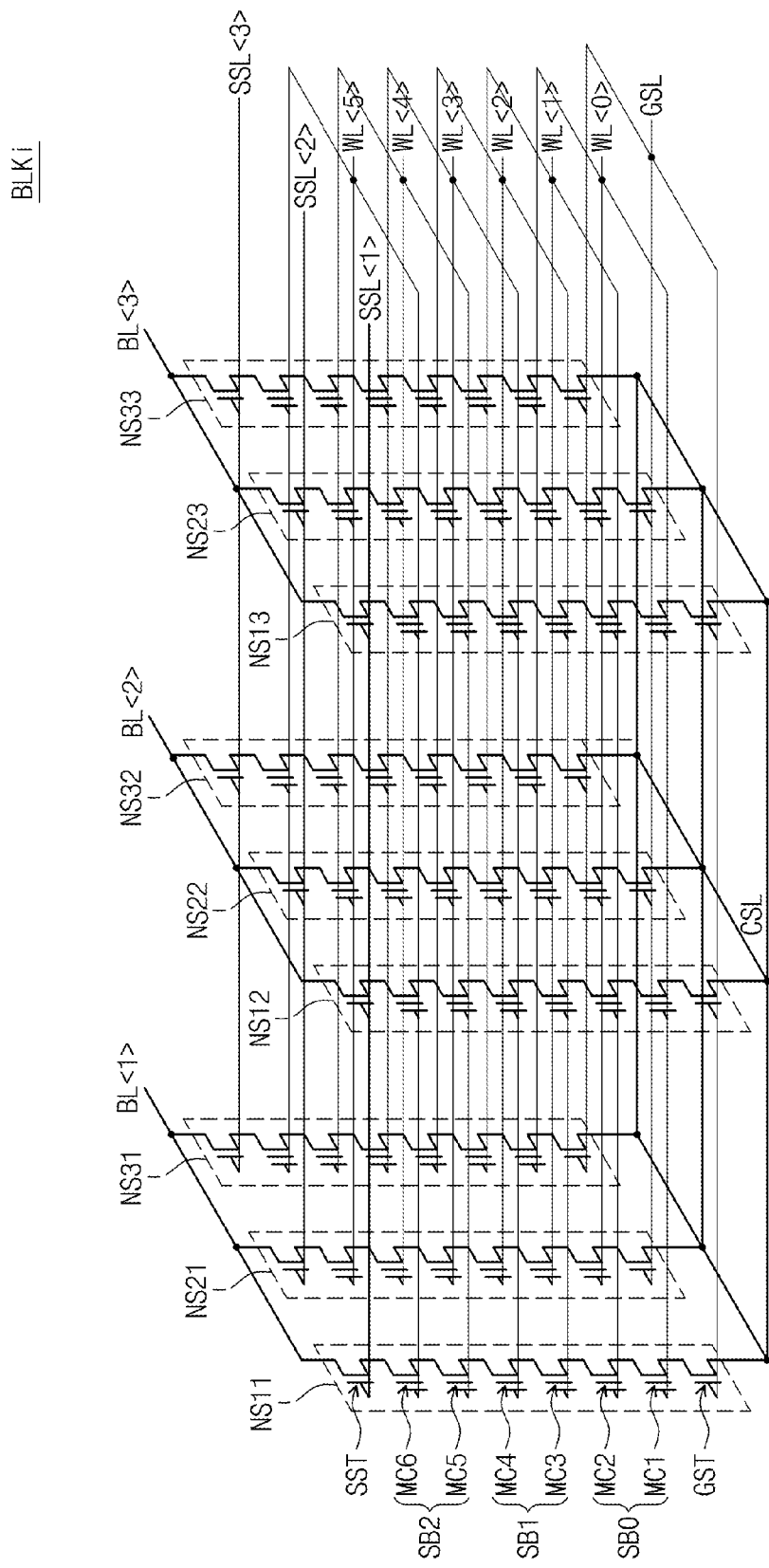
FIG. 6 is an equivalent circuit diagram further illustrating the memory block BLKi of FIG. 5.

FIG. 6 is an equivalent circuit diagram of a memory block BLKi in FIG. 5. Referring to FIGS. 5 to 6, NAND strings NS11, NS21, and NS31 may be provided between a first bit line BL<1> and a common source line CSL. NAND strings NS12, NS22, and NS32 may be provided between a second bit line BL<2> and the common source line CSL. NAND strings NS13, NS23, and NS33 may be provided between a third bit line BL<3> and the common source line CSL. The first to third bit lines BL<1> to BL<3> may correspond to second conductive materials 331 to 333 extending in an x-direction, respectively.

A string selection transistor SST of each cell string may be connected to a corresponding bit line BL. A ground selection transistor GST of each cell string may be connected to the common source line CSL. In each cell string, memory cells MC1 to MC6 may be provided between the string selection transistor SST and the ground selection transistor GST.

Below, the cell strings may be defined by the row and by the column. The cell strings connected in common to one bit line may form one column. For example, the cell strings NS11 to NS31 connected to the first bit line BL<1> may correspond to a first column. The cell strings NS12 to NS32 connected to the second bit line BL<2> may correspond to a second column. The cell strings NS13 to NS33 connected to the third bit line BL<3> may correspond to a third column.

The cell strings connected to one string selection line SSL may form one row. For example, the cell strings NS11 through NS13 connected to a first string selection line SSL<1> may form a first row. The cell strings NS21 through NS23 connected to a second string selection line SSL<2> may form a second row. The cell strings NS31 to NS33 connected to a third string selection line SSL<3> may form a third row.

Each cell string may include a ground selection transistor GST. The ground selection transistors GST may be controlled by a ground selection line GSL. Alternatively, although not shown in FIG. 6, cell strings corresponding to each row can be controlled by different ground selection lines.

Memory cells located at the same semiconductor layer may share a word line. Conductive lines 221 to 223 may be connected in common to form a first word line WL<0>. Conductive lines 231 to 233 may be connected in common to form a second word line WL<1>. Conductive lines 241 to 243 may be connected in common to form a third word line WL<2>. Conductive lines 251 to 253 may be connected in common to form a fourth word line WL<3>. Conductive lines 261 to 263 may be connected in common to form a fifth word line WL<4>. Conductive lines 271 to 273 may be connected in common to form a sixth word line WL<5>.

Cell strings in the same row may share a string selection line SSL. Cell strings in different rows may be connected to different string selection lines SSL<1>, SSL<2>, and SSL<3>, respectively. The common source line CSL may be connected in common to cell strings. For example, the common source line CSL may be formed by interconnecting first to fourth doping regions 311 to 314 (refer to FIG. 5).

The above-described physical block BLKi may be divided into a plurality of sub-blocks SB0, SB1, and SB2 each smaller in size than the physical block BLKi. The sub-blocks SB0, SB1, and SB2 may be divided in a word line direction. Alternatively, the sub-blocks SB0, SB1, and SB2 may be divided on the basis of a bit line or a string selection line. Sub-blocks in the physical block BLKi may be erased independently regardless of a reference used to divide a physical block into sub-blocks.

As an example, the sub-block SB0 may include memory cells, connected with word lines WL<0> and WL<1>, from among memory cells included in the memory block BLKi. The sub-block SB1 may include memory cells, connected with word lines WL<2> and WL<3>, from among memory cells included in the memory block BLKi. The sub-block SB2 may include memory cells, connected with word lines WL<4> and WL<5>, from among memory cells included in the memory block BLKi. Memory cells included in the sub-block SB0 may be selected and erased to be independent from the remaining sub-blocks SB1 and SB2. That is, one or more of the sub-blocks SB0, SB1, and SB2 may be selected and erased at the same time. This operation may necessitate a bias condition for erasing memory cells by a sub-block unit.

As an example, there is described a method of dividing sub-blocks defined within one memory block BLKi. However, a reference used to divide one memory block into sub-blocks may not be limited to this disclosure. For example, there is described the case that one physical block BLKi is divided into three sub-blocks. However, the inventive concept is not limited thereto. For example, one physical block may be divided into two sub-blocks or four or more sub-blocks. In a physical block, sub-blocks can be defined by a string selection line unit or a bit line unit.

FIG. 7 is a diagram illustrating bias conditions that may be used to execute a partial erase operation within a nonvolatile memory device according to an embodiment of the inventive concept. In FIG. 7, there is illustrated an erase bias condition for a physical block PB assumedly divided into three (3) sub-blocks. As an example, each of cell strings constituting one (1) physical block PB is divided into three (3) sub-blocks SB0, SB1, and SB2. The erase bias condition will be described with reference to a cell string NSj included in a physical block PB.

An erase bias condition to erase one sub-block SB0 may be as follows.

A bit line BL, a string selection line SSL1, and a ground selection line GSL may be floated. Word lines WL<2> to WL<5> corresponding to sub-blocks SB1 and SB2 may also be floated. On the other hand, word lines WL<0> and WL<1> corresponding to the sub-block SB0 may be supplied with a ground level or 0V. If an erase voltage Vers being a high voltage is applied to a substrate Sub under this bias condition, memory cells included in the sub-block SB0 may be erased by the F-N tunneling. However, voltages of the word lines WL<2> to WL<5> floated may increase up to a high-voltage level due to the capacitive coupling. In this case, a potential difference sufficient to generate the F-N tunneling may not be produced between the word lines WL<2> to WL<5> and a channel. With the above-described bias condition, it is possible to selectively erase the sub-block SB0.

An erase operation associated with the sub-block SB1 may be similar to that of the sub-block SB0 except that a ground level or 0V is applied to the word lines WL<2> and WL<3> and word lines WL<0>, WL<1>, WL<4>, and WL<5> are floated.

The sub-block SB2 may be erased according to the following erase bias condition. A ground level or 0V may be applied to the word lines WL<4> and WL<5> and word lines WL<0> to WL<3> may be floated. If the erase voltage Vers being a high voltage is applied to the substrate Sub under this bias condition, the sub-block SB2 may be selectively erased. Erasing of sub-blocks may be referred to as partial block erasing.

The physical block PB may be erased under the following bias condition. All of the word lines WL<0> to WL<5> may be grounded, and the bit lines BL and selection lines SSL1 and GSL may be floated. If the erase voltage Vers being a high voltage is applied to the substrate Sub under this bias condition, the physical block PB may be erased.

The case that the sub-blocks SB0 to SB2 are erased independently is described. However, two or more sub-blocks can be erased. For example, the sub-blocks SB0 and SB1 may be erased at the same time. The sub-blocks SB1 and SB2 can also be erased at the same time. The sub-blocks SB0 and SB2 can also be erased at the same time.

With the above-described erase bias condition, the nonvolatile memory device 120 of the inventive concept may include large-capacity physical blocks each capable of being erased by a sub-unit (e.g., a sub-block unit). Thus, when log blocks are allocated by a memory controller 110, they may be allocated by a sub-block unit or a physical block unit. In the event that a sub-block SB0 existing at a free block pool is allocated to a log block, physically, an erase operation on the sub-block SB0 may be preceded. The erased sub-block SB0 may be allocated to a log block on a designated data block, write requested data may be written at the allocated log block.

Figure 8:
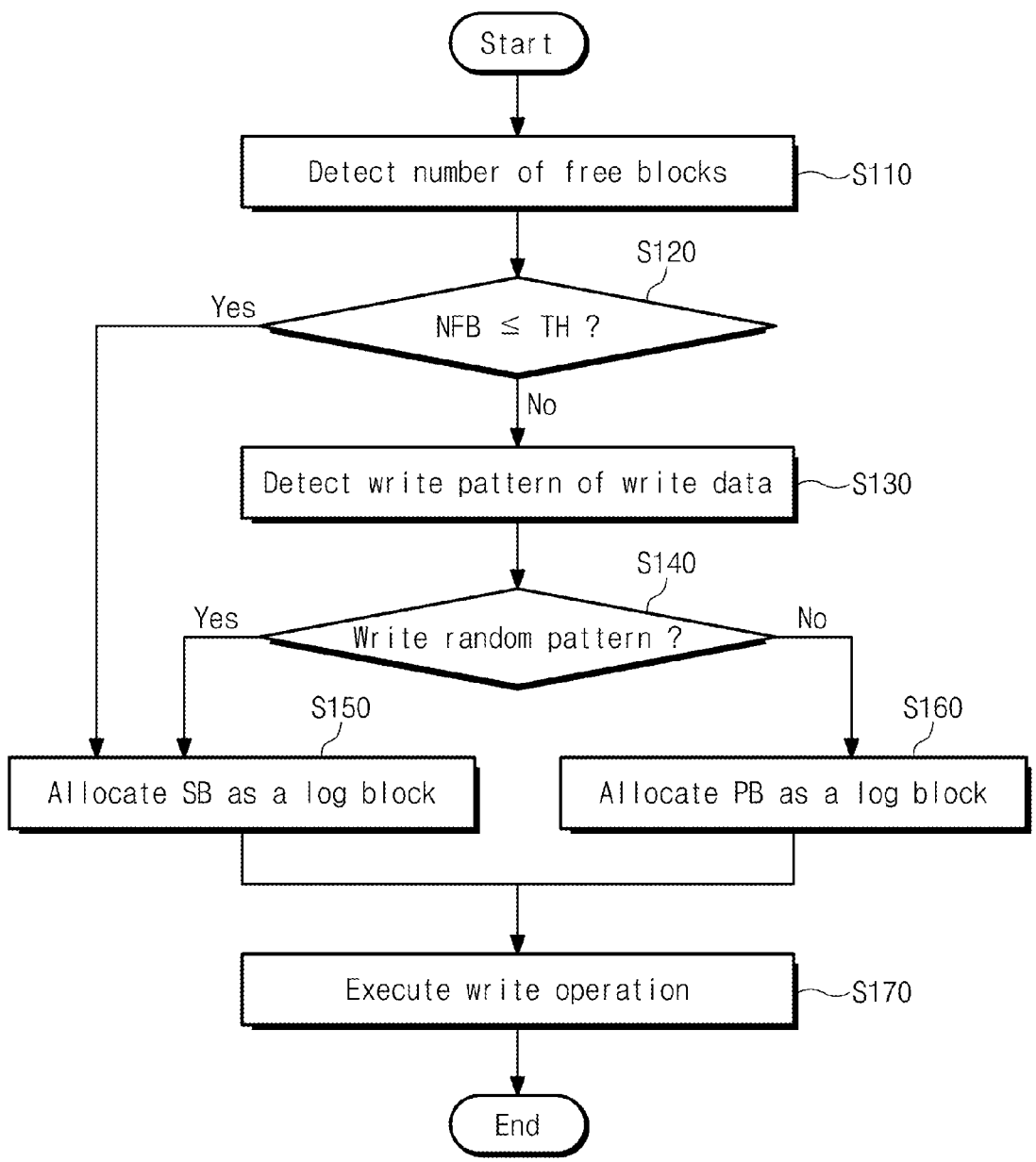
FIG. 8 is a flow chart summarizing a block management method according to an embodiment of the inventive concept.

FIG. 8 is a flow chart summarizing a block management method according to an embodiment of the inventive concept. The illustrated block management method is capable of assigning log blocks according to a sub-block unit, as has been described above.

In the block management method, a memory controller 110 will detect a number of free blocks (NFB) from among a population of memory blocks (S110). The number of free blocks will vary according to a number and type of write, delete and/or housecleaning (or memory management) operations (e.g., garbage collection operations) previously executed by the memory system. The memory controller 110 may be used to detect the number of free blocks NFB in response to each incoming write request received from a host. A FTL driven by the memory controller 110 may than be used to determine whether the current number of free blocks in the memory system 100 is sufficient in relation to the write request.

The memory controller 110 may be used to determine whether the number of free blocks is sufficient (S120). For example, the FTL may determine whether the number of free blocks (NFB) exceeds a threshold value (TH). If the number of free blocks is less than or equal to the threshold value (S120=Yes), the method will allocate a sub-block (SB) as a log block (S150). If, however, the number of free blocks exceeds the threshold value (S120=No), the method will detect a write pattern of the provided write data (S130).

Accordingly, in cases where the number of free blocks is not sufficient (S120=Yes), the memory controller 110 may be used to assign log blocks according to a sub-block unit, regardless of the write pattern (or other relevant attribute) of the write data. Hence, an erase operation may be executed according to the sub-block unit, despite the fact that the memory controller 110 may generate (or obtain) additional free blocks by execution of one or more merge operation(s).

The memory controller 130 may be used to detect the write pattern of the write data using a number of different techniques. For example, if the size of sequentially occurring write data falls below a specific size (e.g., 16 KB), the write data may be determined to be "Random" in its nature. Alternatively, algorithms such as LRU (Least Recently Used), CFLRU (Clean-First LRU), CA (Clock Algorithm), SC (Second Chance), and MDH (Multi-Dimensional Hashing) may be used to analyze the write pattern. However, the inventive concept is not limited thereto.

When the write pattern is determined to be random (S140=Yes), the method again allocates a sub-block as a log block (S150). However, if the write pattern is not Random (S140=No), it is determined to be Sequential in its nature, and the method allocates a physical block (PB) as a log block (S160).

Following allocation of a log block (either S150 or S160), the method will execute the subject write (or program) operation (S170). In this manner, the memory controller 110 may program the write data according to the allocated physical block or sub-block. Once programming of the write data is ended, a program cycle corresponding to one write request is ended.

Selection of a sub-block or physical block in relation to the assignment of a log block may be determined according to a number of free blocks in a current free block pool, as well as potentially, the write pattern for provided write data. In the event that the number of free blocks is not sufficient, a log block will be allocated according to a sub-block unit, regardless of a write pattern. Thus, it is possible to obtain the time necessary for the generation of additional free blocks using (e.g.,) one or more merge operation(s). However, in the event that the number of free blocks NFB is sufficient, either a sub-block or a physical block may be allocated to a log block in accordance with a detected write pattern of the write data. With the above-described features, embodiments of the inventive concept may provide memory systems including a nonvolatile memory device having a relatively large-capacity memory block structure. Yet, said memory systems are able to suppress the number (or frequency) of merge operations required to obtain sufficient free blocks.

Figure 9:
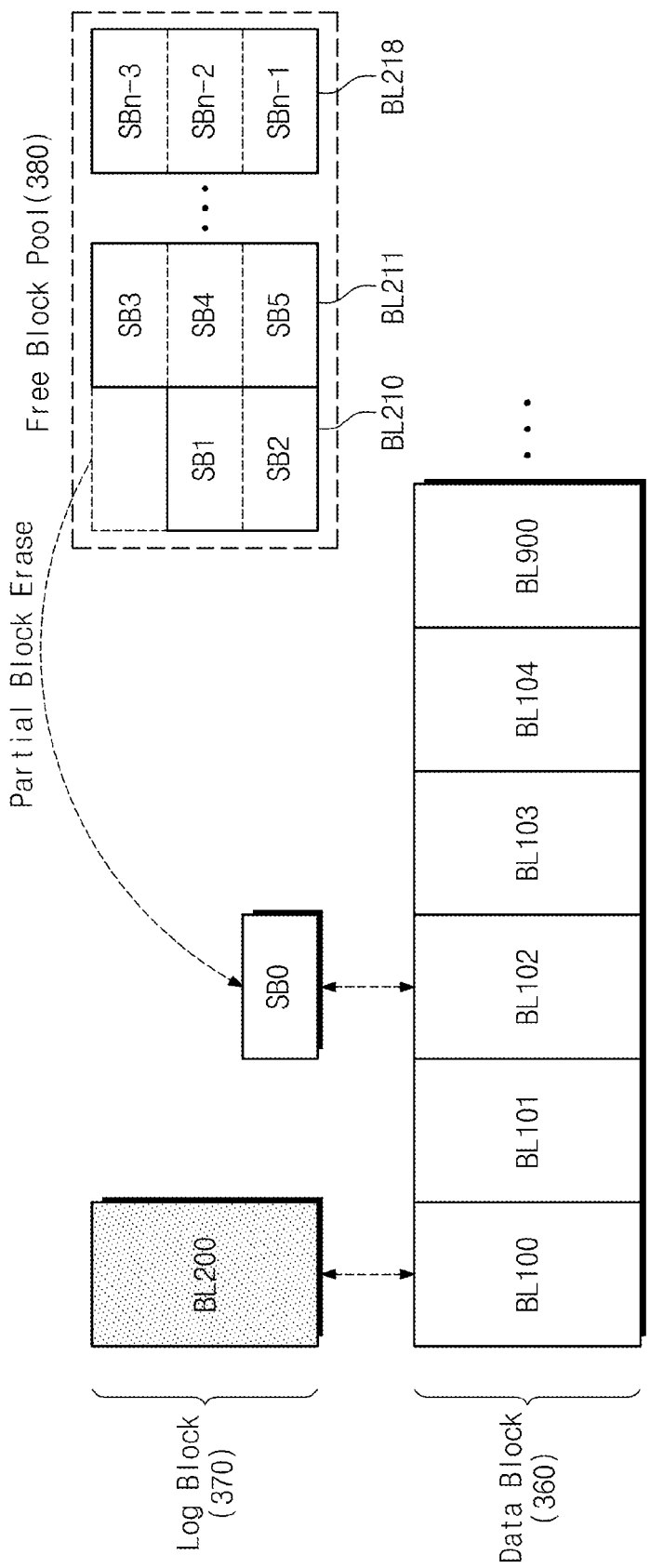
FIG. 9 is a conceptual diagram illustrating a log block allocation method according to an embodiment of the inventive concept.

FIG. 9 is a block diagram illustrating a log block allocation method according to an embodiment of the inventive concept. Referring to FIG. 9, at a write operation, a memory controller 110 (refer to FIG. 1) may divide memory blocks of a nonvolatile memory device 120 (refer to FIG. 1) into data blocks 360, log blocks 370, and free blocks for management. A set of the free blocks may be referred to as a free block pool 380.

The data blocks 360 may include data blocks in which data was previously written. For example, the data blocks 360 may include memory blocks corresponding to physical block numbers (PBNs) of 100, 101, 103, 104, and 900. A substantial memory block appointed by an address through the memory controller 110 may correspond to a data block.

The log blocks may include log blocks to update data blocks selected at an external device. For example, the log blocks 370 may include a physical block BL200 and a sub-block SB0. The physical block BL200 may be allocated to update the data block BL100. The sub-block SB0 may be allocated to update the data block BL102.

The free block pool 380 may include memory blocks erased for a merge operation or a garbage collection operation or memory blocks in which invalid data is stored. The free block pool 380 may include physical blocks BL210, BL211, . . . , BL218. The physical blocks BL210, BL211, . . . , BL218 may be selected by a sub-block unit. Selected sub-blocks may be allocated to log blocks. If a new log block is needed at a write operation, a physical block or one of sub-blocks located at the free block pool 380 may be allocated to a log block.

At least one log block or sub-block may be allocated to one memory block. It is assumed that write requested data is provided by a random pattern having a small size. In this case, the memory controller 110 may assign a block address of the write requested data to a data block BL102. A sub-block SB0 may be assigned as a log block on the write requested data.

The sub-block SB0 selected to be a log block may be erased in a partial block erase manner. If an erase operation on the sub-block SB0 corresponding to a part of a physical block is completed, the sub-block SB0 may b assigned to a log block to update the data block BL102. Write data having a random pattern may be programmed at the sub-block SB0 selected as a log block. Afterwards, data written at the sub-block SB0 may be copied to a new data block with valid data existing at the data block BL102 through a merge operation at a proper time.

Generally, the sub-block SB0 may sufficiently receive write data input by a random pattern. If a log block is allocated by the sub-block unit, thus, the chance that a merge operation or a garbage collection operation is frequently generated due to lack of free blocks may be reduced. The case that one sub-block is assigned to a log block is described. However, the inventive concept is not limited thereto. For example, it is well understood that two or more sub-blocks are assigned to a log block corresponding to a data block.

Figure 10:
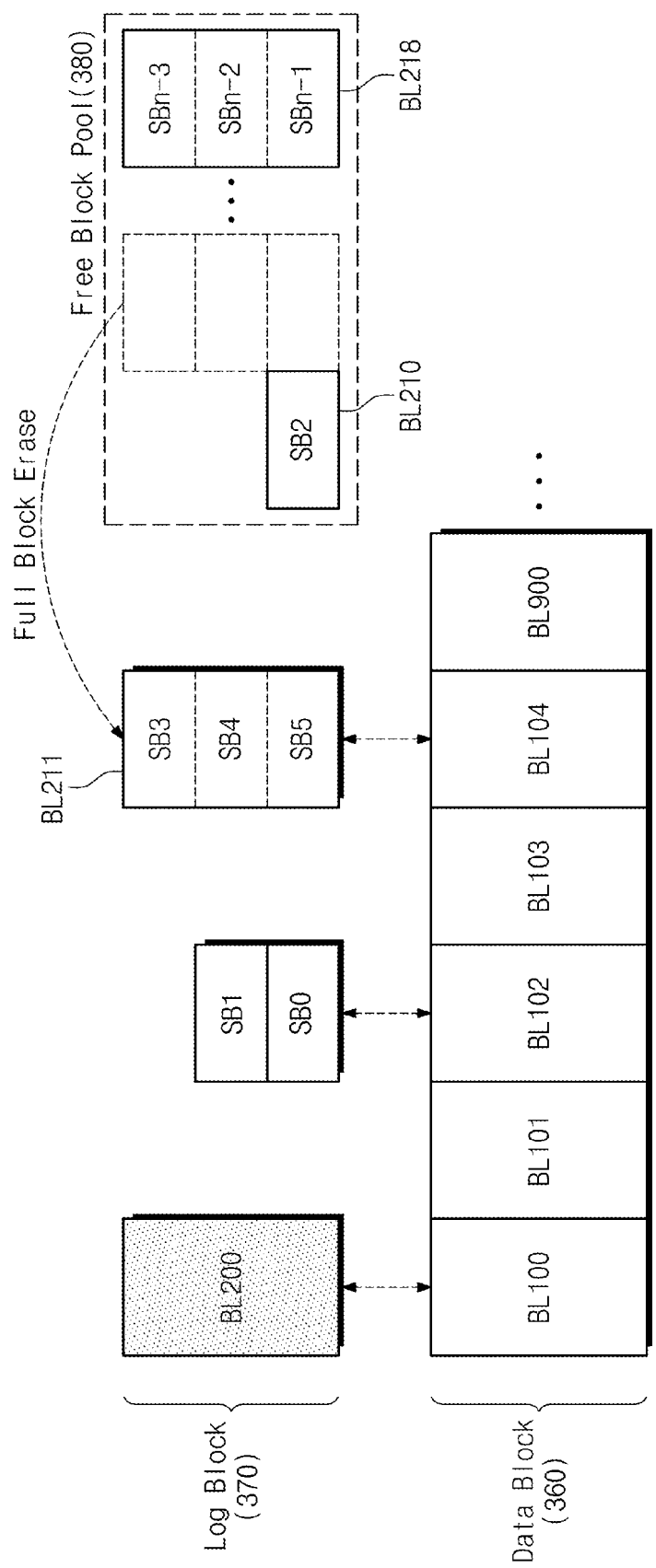
FIG. 10 is a conceptual diagram illustrating a log block allocation method according to another embodiment of the inventive concept.

FIG. 10 is a block diagram illustrating a log block allocation method according to another embodiment of the inventive concept. Referring to FIG. 10, there is illustrated a log block allocating method in case that write requested data is provided by a sequential pattern. Dividing of memory blocks into data blocks 360, log blocks 370, and free blocks may be performed in the same manner as described in FIG. 9, and description thereof is thus omitted.

When a write pattern of write requested data is a sequential pattern, a memory controller 110 may allocate one physical block BL211 to a log block. It is assumed that data corresponding to a data block BL104 has a sequential write pattern. With this assumption, the memory controller 110 may allocate the physical block BL211 to a log block on the data block BL104 in response to a write pattern.

The physical block BL211 selected as a log block may be erased before it is used as a log block. Data having the sequential pattern may be programmed at the erased physical block BL211. Afterwards, valid data existing at the physical block BL211 used as a log block and at the data block BL104 may be copied to a new physical block provided from the free block pool 380. A merge operation may be accomplished by a page copy operation. However, data stored at the log block BL211 can fully replace the data block BL104. This merge manner may be referred to as a swap merge manner in which block only mapping information is changed without a page copy operation.

An example that a log block is allocated by the sub-block unit and examples that a log block is allocated by the physical block unit may be described with reference to FIGS. 9 and 10. The probability that block managing operations to obtain free blocks are performed may be remarkably reduced by setting a log block allocation unit to a unit smaller in size than a large-capacity physical block to alleviate a rapid consumption of the free block pool. If a log block is allocated by a sub-block unit with respect to data input by a random pattern, one sub-block may be rapidly erased. That is, improvement of the write performance may be expected.

Figure 11:
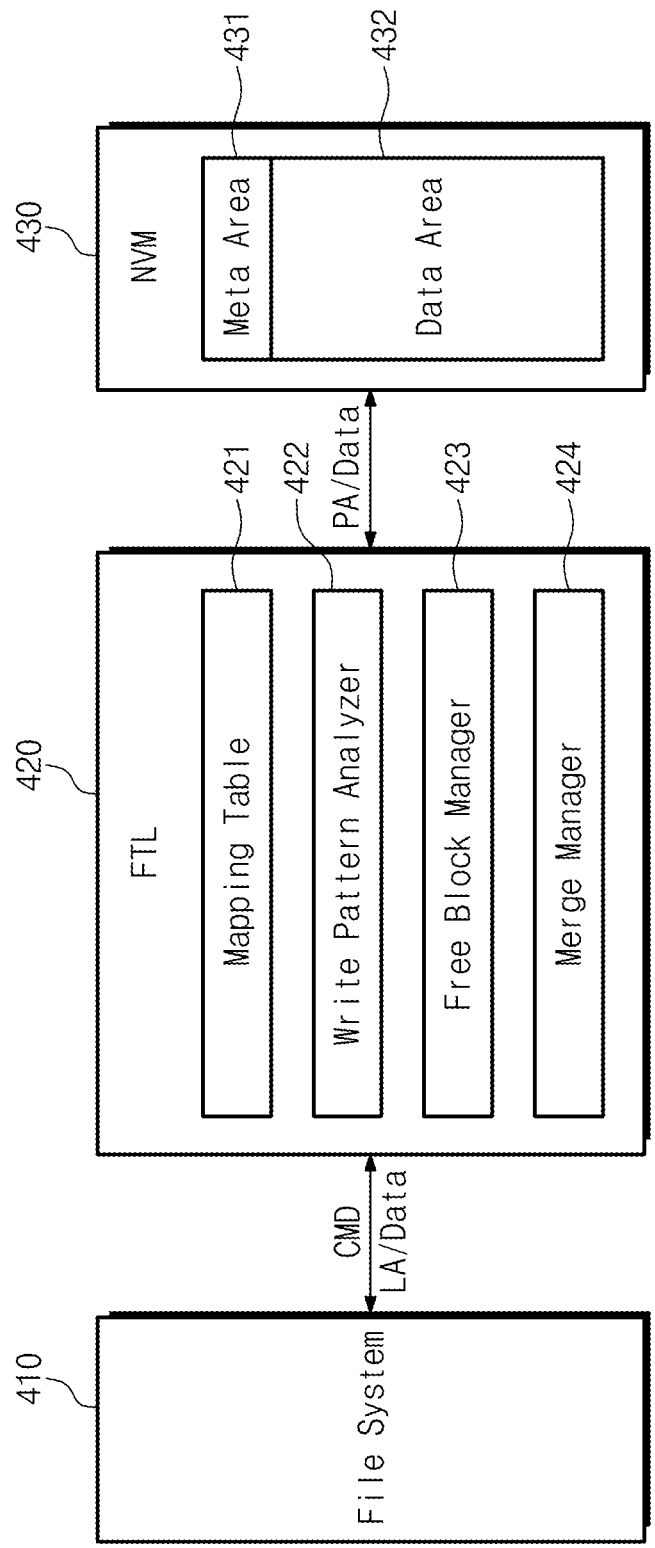
FIG. 11 is a block diagram illustrating exemplary software layers of a memory system according to an embodiment of the inventive concept.

FIG. 11 is a block diagram illustrating a memory system software layer according to an embodiment of the inventive concept. Referring to FIG. 11, software 400 may include a file system 410, a flash translation layer (FTL) 420, and a nonvolatile memory device 430. The FTL 420 may receive a write command CMD, data, and a logical address LA from the file system 410.

The FTL 420 may include modules, such as the mapping table 421, a write pattern analyzer 422, a free block manager 423, and a merge manager 424. The FTL 420 may translate a logical address LA into a physical address PA using a mapping table 421.

The write pattern analyzer 422 may detect a write pattern depending on at least one of the write command CMD, data, or the logical address LA from the file system 410. The detected write pattern may be provided to the merge manager 424. When a size of sequentially input data is below a reference value (e.g., 16 KB), the write pattern analyzer 422 may recognize the sequentially input data as a random pattern. The write pattern analyzer 422 can also determine a write pattern using an algorithm such as LRU (Least Recently Used), CFLRU (Clean-First LRU), CA (Clock Algorithm), SC (Second Chance), or MDH (Multi-Dimensional Hashing). However, the inventive concept is not limited thereto.

The free block manager 423 may manage free blocks in a free block pool managed at the nonvolatile memory device 430. The free block manager 423 may monitor whether the number of physical blocks or sub-blocks in the free block pool is below a reference. If the number of physical blocks or sub-blocks in the free block pool is insufficient, the free block manager 423 may report this state to the merge manager 424.

The merge manager 424 may perform a merge operation such that the number of physical blocks or sub-blocks in the free block pool is properly maintained. The merge manager 424 may select an optimum merge manner based on states of log and data blocks. In the event that the number of free blocks is sufficient, the merge manager 424 may not perform a merge operation to obtain free blocks. If the number of free blocks is insufficient, the merge manager 424 may obtain free blocks by performing a merge operation regardless of a pattern of write data.

The nonvolatile memory device 430 may include a memory area managed by a meta area 431 and a data area 432. The meta area 431 may be used to store mapping information changed due to a merge operation or a garbage collection operation. Mapping and control information generated the FTL 420 may be stored at the meta area 431. The data area 432 may be formed of a plurality of data blocks, and may be used to store user data.

Operation modules included in the FTL 420 of the inventive concept is schematically described. In particular, the FTL 420 may determine a size of a log block to be allocated according to the number of free blocks and a write pattern of data. Thus, the number of merge operations to be executed at a memory system having a large-capacity physical block may be minimized, and usage of a memory block may be maximized.

Figure 12:
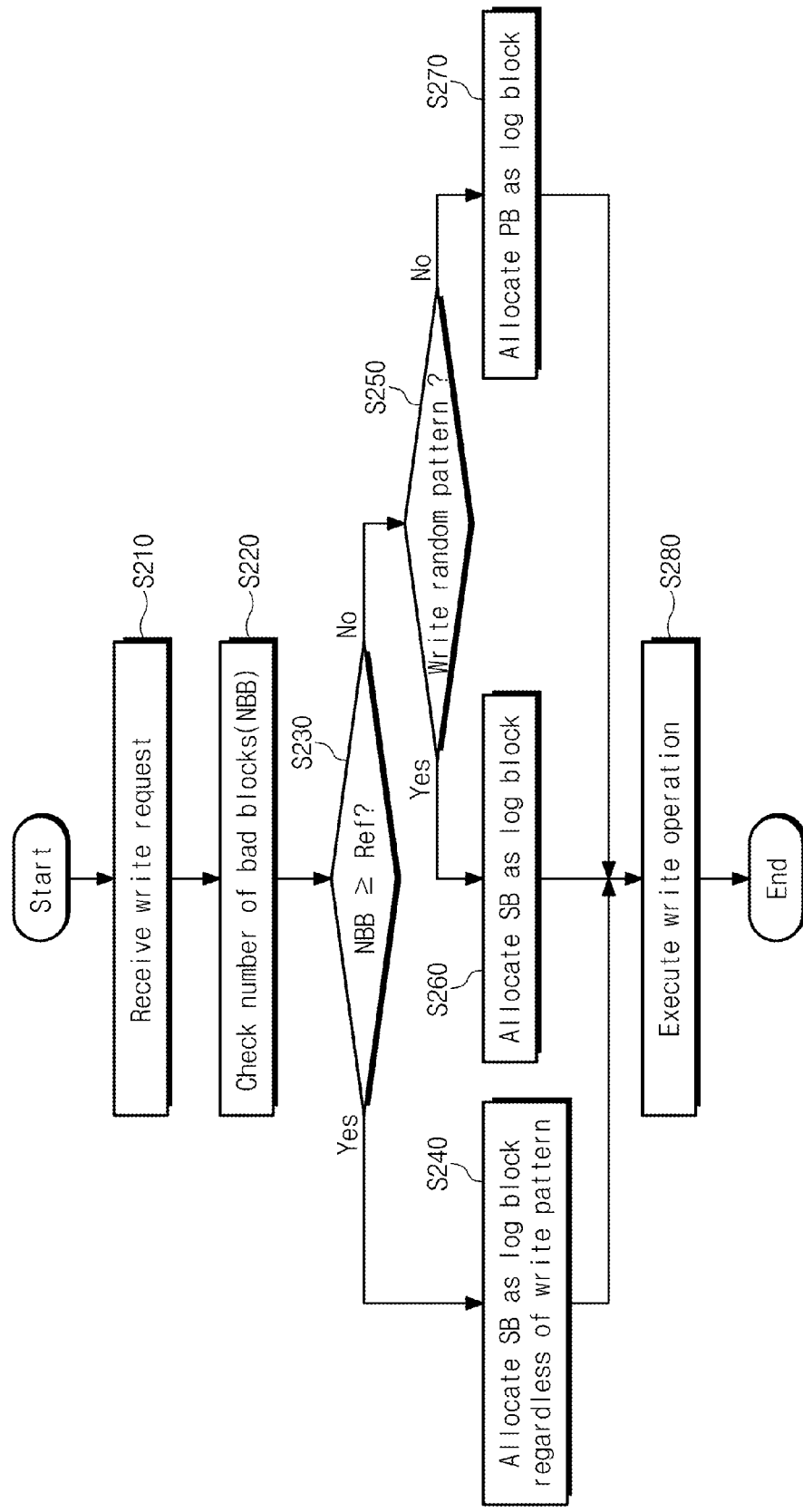
FIG. 12 is a flow chart summarizing a memory block management method according to another embodiment of the inventive concept.

FIG. 12 is a flow chart summarizing a memory block management method in the context of the memory system of FIG. 11 according to another embodiment of the inventive concept. A block management method capable of allocating a log block by a sub-block unit in light of generation of bad blocks will be described with reference to accompanying drawings.

Within the memory block management method, the memory controller 110 receives a write request (or, a write command) from a host (S210). The FTL 420 driven by the memory controller 110 may be used to perform a log block allocation operation according to the inventive concept in response to the write command.

The memory controller 110 may be used to detect a number of bad blocks (NBB) among the memory blocks of the nonvolatile memory device 120 (S220). The bad blocks may include both bad blocks detected at a fabricating level and progressive bad blocks generated by ongoing use of the nonvolatile memory device 120. As the number of bad blocks increases, the number of usable memory blocks will decrease. Thus, as the number of usable memory blocks decreases, it is increasingly difficult to obtain free blocks. According to an embodiment of the inventive concept, reduced memory system performance may be caused by an increase in the number of bad blocks.

The memory controller 110 may be used to determine a particular log block allocation scheme manner according to a number of bad blocks. For example, when the number of bad blocks (NBB) is greater than or equal to a reference value (Ref) (S230Yes), the method will allocate a sub-block as a log block, regardless of write pattern (S240). However, if the number of bad blocks (NBB) is less than the reference value (Ref), the method determines a write pattern for the write data (S250).

Thus, the memory block 110 will allocate a log block according to a sub-block unit regardless of the write pattern of the write data when the number of usable memory blocks decreases to a given degree (S240). In such cases, a log block will only be allocated according to the sub-block unit, so that the frequency with which merge operations required to generate increasingly-difficult-to-generate free blocks is reduced.

In contrast, so long as the number of bad blocks remains below the reference value, the memory controller 110 may be used to detect the write pattern of write data (S250). Upon detecting a random write pattern (S250=Yes), the method will allocate a sub-block (SB) as a log block (S260). However, upon detecting a not-random (or sequential) write pattern (S250=No), the method allocates a physical block (PB) as a log block (S270).

Herein, a write pattern for write data may be detected by evaluating addresses associated with the write data. That is, a write pattern may be determined to be sequential in nature when a sequenced set of write data addresses are detected. In contrast, random addresses will indicate random write data. Alternatively, when the size of sequentially addressed write data falls below a specific size (e.g., 16 KB), sequentially addressed write data is nonetheless recognized as random write data. Write patterns may be determined using an such as conventionally understood algorithms as; LRU (Least Recently Used), CFLRU (Clean-First LRU), CA (Clock Algorithm), SC (Second Chance), or MDH (Multi-Dimensional Hashing). However, the inventive concept is not limited thereto.

Following allocation of a log block (either 5240, 5260, or S270), the method will execute the subject write (or program) operation (S280). In this manner, the memory controller 110 may program write data according to the allocated physical block or sub-block. Once programming of the write data is ended, a program cycle corresponding to one write request is ended.

Selection of a sub-block or physical block to allocate a log block may be determined according to the number of bad blocks NBB currently detected at the memory system 100 and a write pattern of write requested data. If the number of bad blocks increases over a reference value, a log block may be assigned by a sub-block unit regardless of a write pattern. Thus, although usable memory blocks relatively decreases, a cost needed to obtain free blocks may be minimized.

Figure 13:
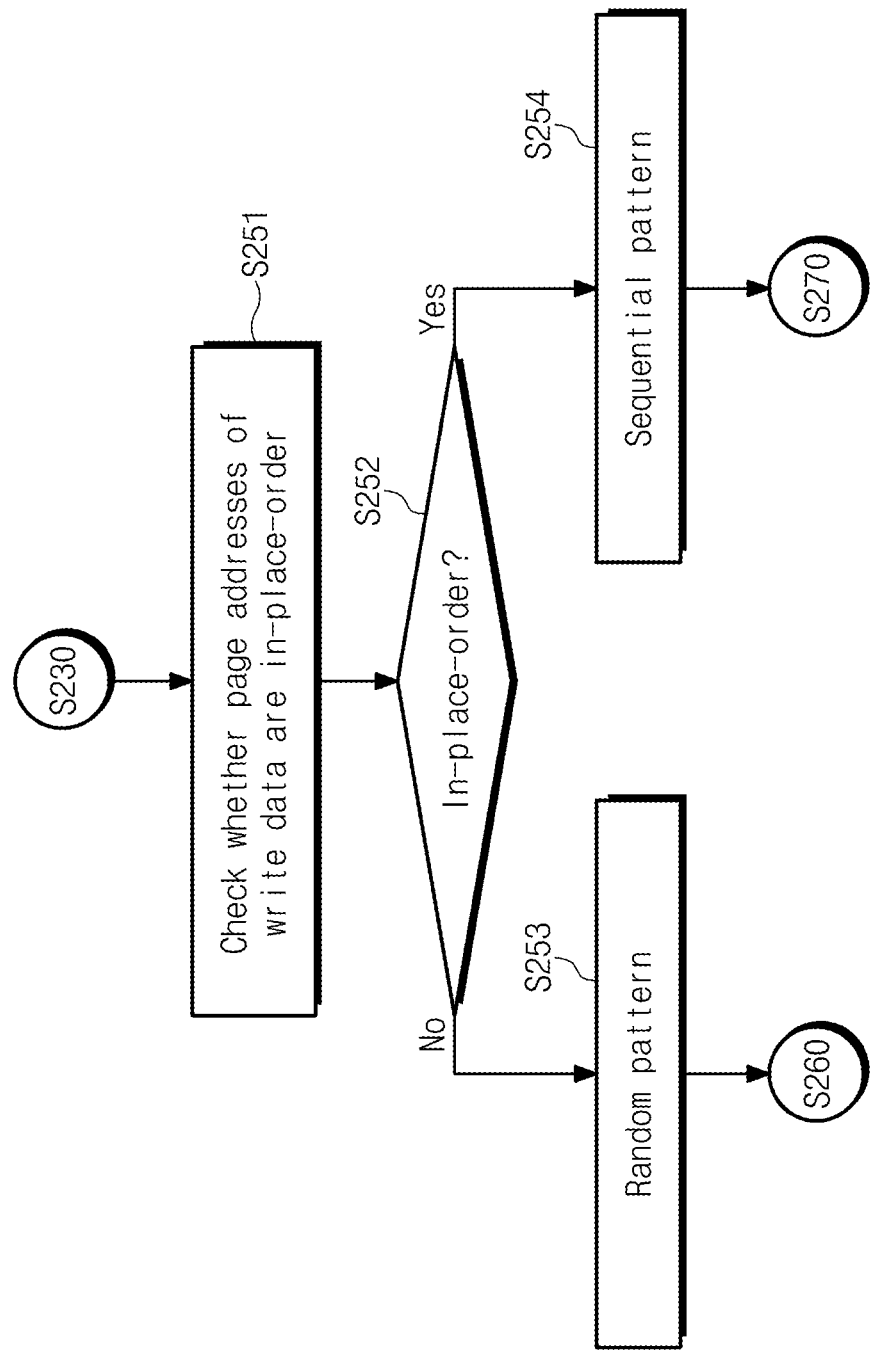
FIG. 13 is a flow chart further summarizing a write pattern determining method.

FIG. 13 is a flow chart further illustrating one approach to the method step of FIG. 12 wherein a write pattern is determined (S250). Again the memory controller 110 may be used to detect whether page addresses for write data are in-place-order (S251). That is, the memory controller 110 may be used to detect whether page addresses for the write data are continuous in nature. If page addresses for the write data are not deemed to be in-place-order (S252=No), the write data is determined to have a random pattern (S253), regardless of memory block location. Otherwise (S252=Yes), the write data is determined to be sequential order pattern (S254).

Figure 14:
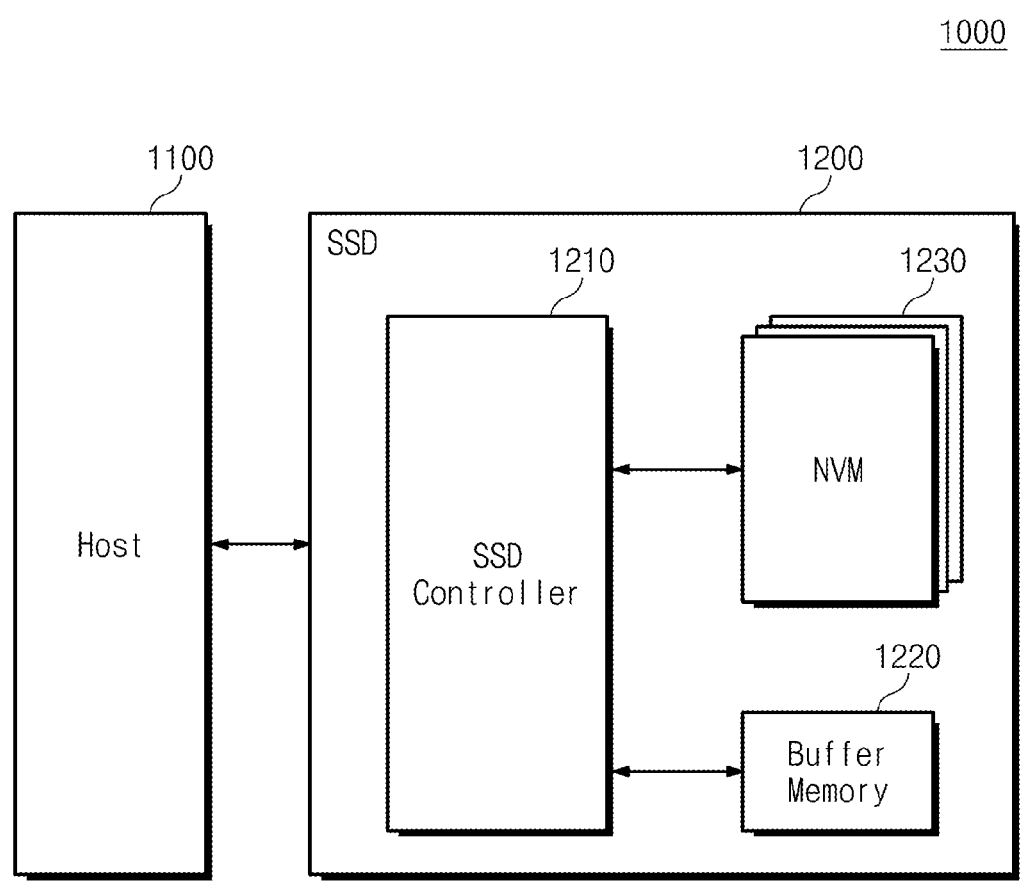
FIG. 14 is a block diagram illustrating a user device including a solid state drive according to an embodiment of the inventive concept.

FIG. 14 is a block diagram illustrating a user device including a solid state drive according to an embodiment of the inventive concept. Referring to FIG. 14, a user device 1000 may include a host 1100 and a solid state drive (hereinafter, referred to as SSD) 1200. The SSD 1200 may include an SSD controller 1210, a buffer memory 1220, and a nonvolatile memory device 1230.

The SSD controller 1210 may provide physical interconnection between the host 1100 and the SSD 1200. The SSD controller 1210 may provide an interface with the SSD 1200 corresponding to a bus format of the host 1100. In particular, the SSD controller 1210 may decode a command provided from the host 1100, and may access the nonvolatile memory device 1230 according to the decoding result. The bus format of the host 1100 may include USB (Universal Serial Bus), SCSI (Small Computer System Interface), PCI express, ATA, PATA (Parallel ATA), SATA (Serial ATA), SAS (Serial Attached SCSI), and the like.

The buffer memory 1220 may temporarily store write data provided from the host 1100 or data read out from the nonvolatile memory device 1230. In the event that data existing in the nonvolatile memory device 1230 is cached, at a read request of the host 1100, the buffer memory 1220 may support a cache function to provide cached data directly to the host 1100. Typically, a data transfer speed of a bus format (e.g., SATA or SAS) of the host 1100 may be higher than that of a memory channel of the SSD 1200. That is, in the event that an interface speed of the host 1100 is remarkably fast, lowering of the performance due to a speed difference may be minimized by providing the buffer memory 1220 having a large storage capacity.

The buffer memory 1220 may be formed of a synchronous DRAM to provide sufficient buffering to the SSD 1200 used as an auxiliary mass storage device. However, the buffer memory 1220 is not limited to this disclosure.

The nonvolatile memory device 1230 may be provided as a storage medium of the SSD 1200. For example, the nonvolatile memory device 1230 may be formed of a vertical NAND flash memory device having a mass storage capacity. The nonvolatile memory device 1230 may be formed of a plurality of memory devices. In this case, the memory devices may be connected to the SSD controller 1210 by a channel unit, respectively. As a storage medium, the nonvolatile memory device 1230 may be formed of a NAND flash memory. However, the nonvolatile memory device 1230 is not limited to a NAND flash memory device. For example, a storage medium of the SSD 1200 can be formed of a PRAM, an MRAM, a ReRAM, a FRAM, a NOR flash memory, and the like. Further, the inventive concept may be applied to a memory system which uses different types of memory devices together. The nonvolatile memory device 1230 may be configured substantially the same as that described FIG. 3.

In the SSD 1200, the SSD controller 1210 may decide a size of a data or log block adaptively according to the number of free blocks and a write pattern of input data. That is, when the number of free blocks is less than a threshold value, the SSD controller 1210 may assign log blocks by a sub-block unit regardless of a write pattern of data. On the other hand, when the number of free blocks is more than the threshold value, the SSD controller 1210 may assign log or data blocks by a sub-block unit or a physical block unit in view of a write pattern of data. The SSD controller 1210 may also decide a size of a data or log block adaptively according to the number of bad blocks and a write pattern of input data.

The nonvolatile memory device 1230 may operate the same as a nonvolatile memory device in FIG. 3. That is, the nonvolatile memory device 1230 may include large-capacity memory blocks, each of which is selected and erased by a sub-block unit.

Figure 15:
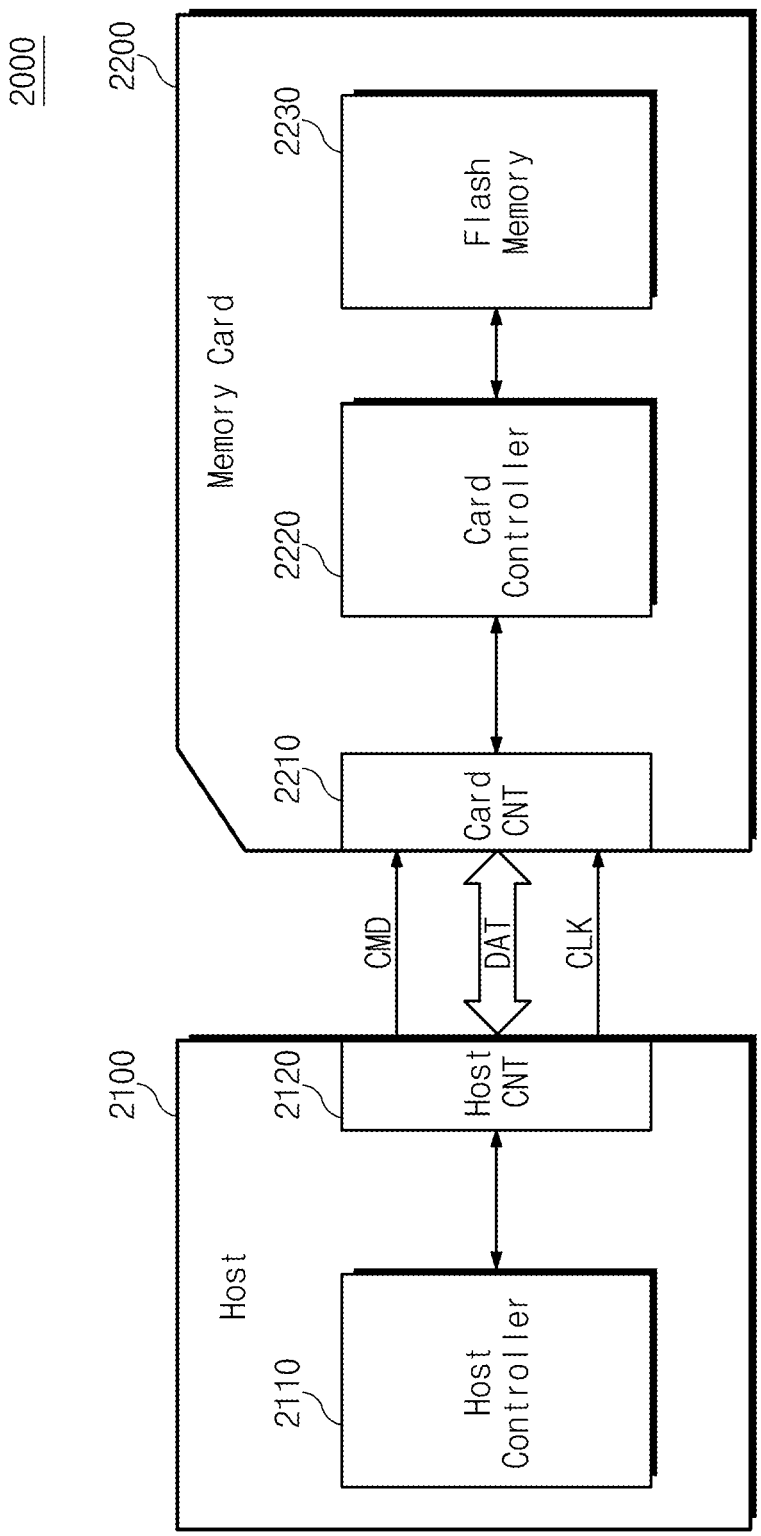
FIG. 15 is a block diagram illustrating a memory card according to an embodiment of the inventive concept.

FIG. 15 is a block diagram illustrating a memory card according to an embodiment of the inventive concept. Referring to FIG. 15, a memory card system 2000 may include a host 2100 and a memory card 2200. The host 2100 may include a host controller 2110 and a host connection unit 2120. The memory card 2200 may include a card connection unit 2210, a card controller 2220, and a flash memory 2230.

Each of the host connection unit 2120 and the card connection unit 2210 may be formed of a plurality of pins. Such pins may include a command pin, a data pin, a clock pin, a power pin, etc. The number of pins may vary according to a type of the memory card 2200. In example embodiments, an SD card may include nine pins.

The host 2100 may be configured to write data in the memory card 2200 or to read data stored in the memory card 2200. The host controller 2110 may send a command (e.g., a write command), a clock signal CLK generated within a clock generator (not shown) of the host 2100, and data to the memory card 2200 via the host connection unit 2120.

The card controller 2220 may operate responsive to a write command received via the card connection unit 2210, and may store data in the memory 2230 in synchronization with a clock signal generated by a clock generator (not shown) of the card controller 2220. The memory 2230 may store data transferred from the host 2100. For example, if the host 2100 is a digital camera, the memory 2230 may store image data.

The card controller 2220 may decide a size of a data or log block adaptively according to the number of free blocks and a write pattern of input data. That is, when the number of free blocks is less than a threshold value, the card controller 2220 may assign log blocks by a sub-block unit regardless of a write pattern of data. On the other hand, when the number of free blocks is more than the threshold value, the card controller 2220 may assign log or data blocks by a sub-block unit or a physical block unit in view of a write pattern of data. The card controller 2220 may also decide a size of a data or log block adaptively according to the number of bad blocks and a write pattern of input data.

The card connection unit 2210 may be configured to communicate with an external device (e.g., a host) using one of various interface protocols such as USB, MMC, PCI-E, SAS, SATA, PATA, SCSI, ESDI, IDE, and the like.

Figure 16:
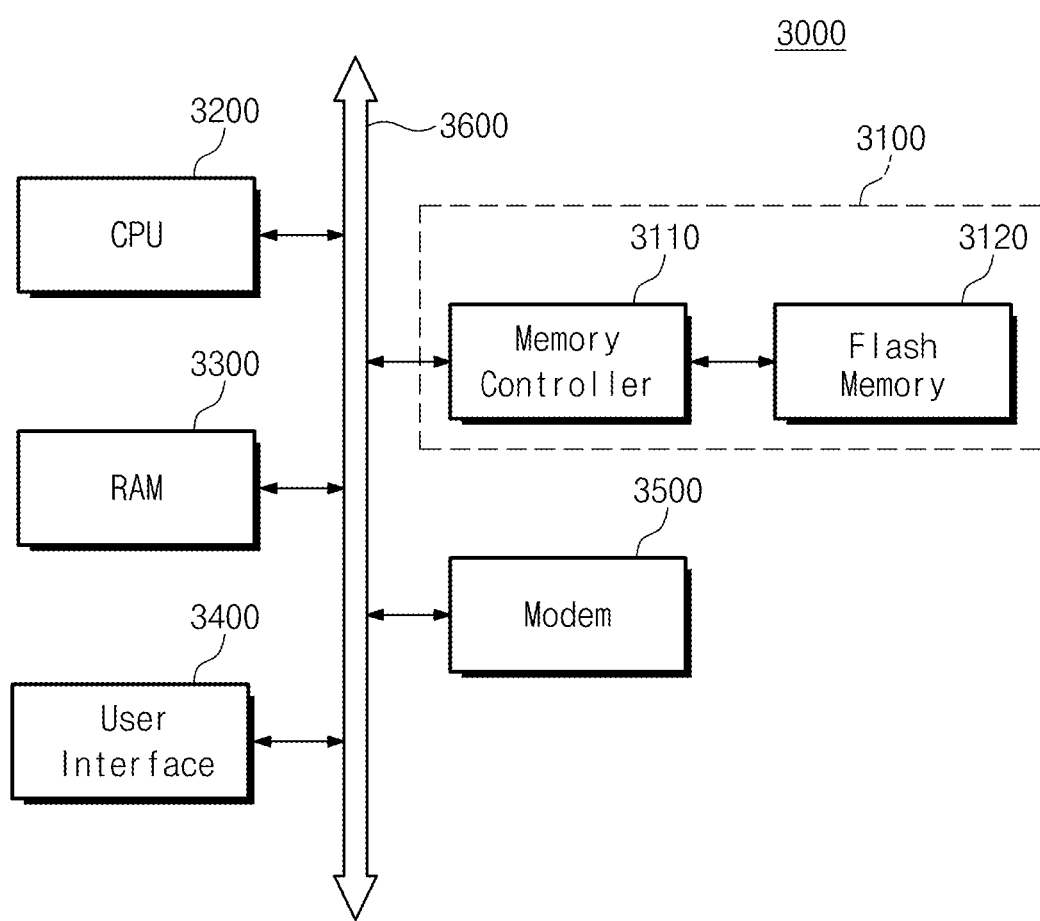
FIG. 16 is a block diagram illustrating a computing system including a flash memory device according to an embodiment of the inventive concept.

FIG. 16 is a block diagram illustrating a computing system including a flash memory device according to an embodiment of the inventive concept. A computing system 3000 may include a microprocessor 3200, a RAM 3300, a user interface 3400, a modem 3500 such as a baseband chipset, and a memory system 3100 which are electrically connected with a system bus 3600. The memory system 3100 may be configured the same as an SSD in FIG. 14 or a memory card in FIG. 15.

If the computing system 3000 is a mobile device, it may further include a battery (not shown) which powers the computing system 3000. Although not shown in FIG. 16, the computing system 3000 may further include an application chipset, a camera image processor (CIS), a mobile DRAM, and the like. The memory system 3100 may be a solid state drive/disk (SSD) which uses a nonvolatile memory to store data. Alternatively, the memory system 3100 may be formed of a fusion flash memory (e.g., a One-NAND flash memory).

In memory controller 3110 may decide a size of a data or log block adaptively according to the number of free blocks and a write pattern of input data. That is, when the number of free blocks is less than a threshold value, the memory controller 3110 may assign log blocks by a sub-block unit regardless of a write pattern of data. On the other hand, when the number of free blocks is more than the threshold value, the memory controller 3110 may assign log or data blocks by a sub-block unit or a physical block unit in view of a write pattern of data. The memory controller 3110 may also decide a size of a data or log block adaptively according to the number of bad blocks and a write pattern of input data.

A nonvolatile memory device and/or a memory controller may be packed by one selected from various types of packages such as PoP (Package on Package), Ball grid arrays (BGAs), Chip scale packages (CSPs), Plastic Leaded Chip Carrier (PLCC), Plastic Dual In-Line Package (PDI2P), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

While the inventive concept has been described with reference to exemplary embodiments, it will be apparent to those skilled in the art that various changes and modifications may be made without departing from the scope of the following claims. Therefore, it should be understood that the above embodiments are not limiting, but illustrative.

What is claimed is:

1. A method of storing write data in a storage device including a nonvolatile memory device having a memory cell array of nonvolatile memory cells, the method comprising:

receiving write data in conjunction with a write request indicating a write operation;

in response to the write request, detecting a number of free blocks available in the memory cell array;

if the detected number of free blocks is less than a threshold value, allocating a log block only in accordance with a sub-block unit, and if the detected number of free blocks is not less than the threshold value, allocating the log block in accordance with one of the sub-block unit and a physical block unit, wherein the sub-block unit is smaller than the physical block unit; and executing the write operation for the write data according to the log block, wherein the memory cell array is a three-dimensional memory cell array, and wherein the sub-block unit corresponds to an erase unit of the memory cell array.

2. The method of claim 1, further comprising:

if the detected number of free blocks is not less than the threshold value, determining whether the write data has a random write pattern.

3. The method of claim 2, further comprising:

upon determining that the write data has a random pattern, allocating the log block in accordance with a sub-block unit, else allocating the log block in accordance with the physical block unit.

4. The method of claim 2, wherein said determining whether the write data has a random write pattern comprises evaluating a set of addresses associated with the write data.

5. The method of claim 4, wherein said evaluating the set of addresses associated with the write data comprises determining whether the set of addresses are in-place-order addresses.

6. The method of claim 4, wherein said evaluating the set of addresses associated with the write data comprises determining whether the set of addresses are discontinuous.

7. The method of claim 1, wherein the nonvolatile memory cells are NAND flash memory cells, and a physical block defining the physical block unit includes NAND flash memory cells arranged in strings commonly connected to at least one word line.

8. The method of claim 7, wherein the physical block may be erased during one erase operation performed by the nonvolatile memory device.

9. The method of claim 7, wherein the physical block includes multiple sub-blocks each being defined by the sub-block unit, and each of the sub-blocks include NAND flash memory cells commonly connected to at least a portion of only one word line.

10. The method of claim 9, wherein each one of the sub-blocks is independently erased during one erase operation performed by the nonvolatile memory device.

11. A method of storing write data in a storage device including a nonvolatile memory device having a memory cell array of nonvolatile memory cells, the method comprising:

receiving write data in conjunction with a write request indicating a write operation;

in response to the write request, determining a number of bad blocks among a plurality of memory blocks in the memory cell array;

if the number of bad blocks is greater than a threshold value, allocating a log block only in accordance with a sub-block unit, and if the number of bad blocks is not greater than the threshold value, allocating the log block in accordance with one of the sub-block unit and a physical block unit, wherein the sub-block unit is smaller than the physical block unit; and executing the write operation for the write data according to the log block, wherein the memory cell array is a three-dimensional memory cell array, and wherein the sub-block unit corresponds to an erase unit of the memory cell array.

12. The method of claim 11, further comprising:

if the number of bad blocks is not greater than the threshold value, determining whether the write data has a random write pattern.

13. The method of claim 12, further comprising:

upon determining that the write data has a random write pattern, allocating the log block in accordance with a sub-block unit, else allocating the log block in accordance with the physical block unit.

14. The method of claim 12, wherein said determining whether the write data has a random write pattern comprises evaluating a set of addresses associated with the write data.

15. The method of claim 14, wherein said evaluating the set of addresses associated with the write data comprises determining whether the set of addresses are in-place-order addresses.

16. The method of claim 14, wherein said evaluating the set of addresses associated with the write data comprises determining whether the set of addresses are discontinuous.

17. The method of claim 11, wherein the nonvolatile memory cells are NAND flash memory cells, and a physical block defining the physical block unit includes NAND flash memory cells arranged in strings commonly connected to at least one word line.

18. The method of claim 17, wherein the physical block may be erased during one erase operation performed by the nonvolatile memory device.

19. The method of claim 17, wherein the physical block includes multiple sub-blocks each being defined by the sub-block unit, and each of the sub-blocks include includes NAND flash memory cells commonly connected to at least a portion of only one word line.

20. The method of claim 19, wherein each one of the sub-blocks is independently erased during one erase operation performed by the nonvolatile memory device.

* * * * *